(12) United States Patent
Omori et al.

(10) Patent No.: US 8,070,223 B2
(45) Date of Patent: Dec. 6, 2011

(54) VEHICLE SEAT WITH CUSHION PLATE

(75) Inventors: Misao Omori, Tochigi (JP); Kenichi Niitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 12/962,977

(22) Filed: Dec. 8, 2010

(65) Prior Publication Data

US 2011/0074191 A1 Mar. 31, 2011

Related U.S. Application Data

(62) Division of application No. 11/718,309, filed as application No. PCT/JP2005/019937 on Oct. 28, 2005, now Pat. No. 7,967,380.

(30) Foreign Application Priority Data

Oct. 28, 2004 (JP) .................................. 2004-313623

(51) Int. Cl.
*B60N 2/42* (2006.01)
*A47C 7/46* (2006.01)
(52) U.S. Cl. ................................ 297/216.12; 297/284.4
(58) Field of Classification Search ............... 297/216.1, 297/216.12, 284.4, 284.7
See application file for complete search history.

(56) References Cited

U.S. PATENT DOCUMENTS

| | | | |
|---|---|---|---|
| 4,632,454 A | 12/1986 | Naert | |
| 5,076,643 A | 12/1991 | Colasanti et al. | |
| 6,139,102 A | 10/2000 | von Möller | |
| 6,250,714 B1 | 6/2001 | Nakano et al. | |
| 6,260,921 B1 | 7/2001 | Chu et al. | |
| 6,375,262 B1 | 4/2002 | Watanabe | |
| 6,568,753 B1 | 5/2003 | Watanabe | |
| 6,702,377 B2 | 3/2004 | Nakano | |
| 6,783,177 B1 | 8/2004 | Nakano | |
| 6,789,845 B2 | 9/2004 | Farquhar et al. | |
| 6,789,846 B2 | 9/2004 | Humer et al. | |
| 6,918,633 B2 | 7/2005 | Forkel et al. | |
| 6,955,397 B1 | 10/2005 | Humer | |
| 7,044,544 B2 | 5/2006 | Humer et al. | |
| 7,052,087 B2 | 5/2006 | McMillen | |
| 7,077,472 B2 | 7/2006 | Steffens, Jr. | |
| 7,104,602 B2 | 9/2006 | Humer et al. | |
| 7,270,374 B2 | 9/2007 | Moriggi | |
| 7,393,052 B2 | 7/2008 | Humer et al. | |
| 7,644,987 B2 * | 1/2010 | Humer et al. | 297/216.12 |
| 2009/0001785 A1 * | 1/2009 | Swan et al. | 297/216.12 |

FOREIGN PATENT DOCUMENTS

JP 7-75608 A 3/1995

(Continued)

*Primary Examiner* — Sarah B McPartlin
(74) *Attorney, Agent, or Firm* — Drinker Biddle & Reath LLP

(57) ABSTRACT

A vehicle seat comprises a rectangular-shaped seat back frame having right and left side frames; a flexible plate member provided between the right and left side frames; a seat back cushion provided in front of the flexible plate member; a mechanism for pushing the seat back cushion to a front direction by forwardly protruding the flexible plate member that results from the flexible plate member being bent; a headrest for supporting a head of a seat occupant, wherein the headrest is forwardly movably connected to the right and left side frames via right and left link members; and a rear-end collision detecting plate disposed at a portion of the seat back frame behind the seat occupant, wherein the rear-end collision detecting plate detects rearward movement of the seat occupant.

47 Claims, 8 Drawing Sheets

FOREIGN PATENT DOCUMENTS

| | | |
|---|---|---|
| JP | 10-138811 A | 5/1998 |
| JP | 10-138814 A | 5/1998 |
| JP | 11-034708 A | 2/1999 |
| JP | 11-192869 A | 7/1999 |
| JP | 11-206506 A | 8/1999 |
| JP | 2000-201769 A | 7/2000 |
| JP | 2000-210157 A | 8/2000 |
| JP | 2003-341401 A | 12/2003 |

* cited by examiner ies a PCT national stage entry of international patent application
VEHICLE SEAT WITH CUSHION PLATE

CROSS-REFERENCE TO RELATED APPLICATIONS

This application is a divisional application of U.S. patent application Ser. No. 11/718,309, filed Nov. 21, 2007, which is a PCT national stage entry of international patent application no. PCT/JP2005/19937, filed Oct. 28, 2005, which claims the foreign priority benefit of Japanese patent application no. JP2004-313623, filed Oct. 28, 2004. The contents of these applications are herein incorporated by reference.

TECHNICAL FIELD

The present invention relates to a vehicle seat, and particularly to a vehicle seat having a cushion plate with a pressure adjusting mechanism.

BACKGROUND

A conventional seat back cushion for a vehicle seat is resiliently supported by means of a number of seat springs which are located between side frames of a seat back frame. The seat springs generally comprise zigzag springs or formed wire springs.

The degree of bending of the seat springs locally vary depending on the magnitude of load imparted. The springs located in the upper and lower portions of the seat back frame are more bent than those located in the central portion of the seat back frame. Even in one spring, the central part of the spring is more bent than the right and left side parts of the spring. Thus, the degree of bending of the springs are locally varied. This brings about deterioration of the stability and comfort of the seat when a person sits on the seat.

Japanese Patent Application Laid-Open No. 11-206506 discloses a structural arrangement where an auxiliary plate, which is forwardly and rearwardly movable, is provided in connection with the cushion plate.

The auxiliary plate disclosed in Japanese Patent Application Laid-Open No. 11-206506 is integrally formed at the central part of the cushion plate, and the cushion plate is disposed only around the auxiliary plate. Therefore, the cushion plate disposed around the auxiliary plate fails to exhibit its function as the mechanism for resiliently supporting the seat back cushion. This means that a load of the seated person is focused on the auxiliary plate and is not effectively dispersed in the cushion plate.

Also in the conventional technique, it is difficult to provide both of a pressure adjusting mechanism of the cushion plate and an active headrest mechanism for moving the headrest to the front when the vehicle rear-end collision occurs in the seat back. In other words, the pressure adjusting mechanism lowers a sensitivity of a collision detector of the active headrest mechanism, and hence, it is difficult to coexistently provide both of the mechanisms.

SUMMARY

Accordingly, an object of various embodiments of the present invention is to provide a cushion plate with a pressure adjusting mechanism which is able to support the seated person while effectively dispersing the load of the seated person.

Another object is to provide a vehicle seat having a cushion plate with a pressure adjusting mechanism and an active headrest mechanism for moving the headrest to the front when the vehicle rear-end collision occurs.

In more detail, various embodiments of the invention provide a vehicle seat that comprises a rectangular-shaped seat back frame having right and left side frames; a flexible plate member provided between the right and left side frames; a seat back cushion provided in front of the flexible plate member; a mechanism for pushing the seat back cushion to a front direction by forwardly protruding the flexible plate member that results from the flexible plate member being bent; a headrest for supporting a head of a seat occupant, wherein the headrest is forwardly movably connected to the right and left side frames via right and left link members; and a rear-end collision detecting plate disposed at a portion of the seat back frame behind the seat occupant, wherein the rear-end collision detecting plate detects rearward movement of the seat occupant; wherein: each end portion of the rear-end collision detecting plate extends to a respective outer side of an end of the flexible plate member and is connected to a lower end portion of a respective link member; the flexible plate member is disposed anterior to the rear-end collision detecting plate; an upper end of the flexible plate member is disposed above an upper end of the rear-end collision detecting plate; and all of the rear-end collision detecting plate is positioned within a region between the upper end of the flexible plate member and a maximum forward portion of a curve of the flexible plate member formed when the flexible plate member is bent.

BRIEF DESCRIPTION OF THE DRAWINGS

The following drawings illustrate an embodiment of the invention that is described in more detail below.

DETAILED DESCRIPTION OF THE EMBODIMENTS

Figure 1:
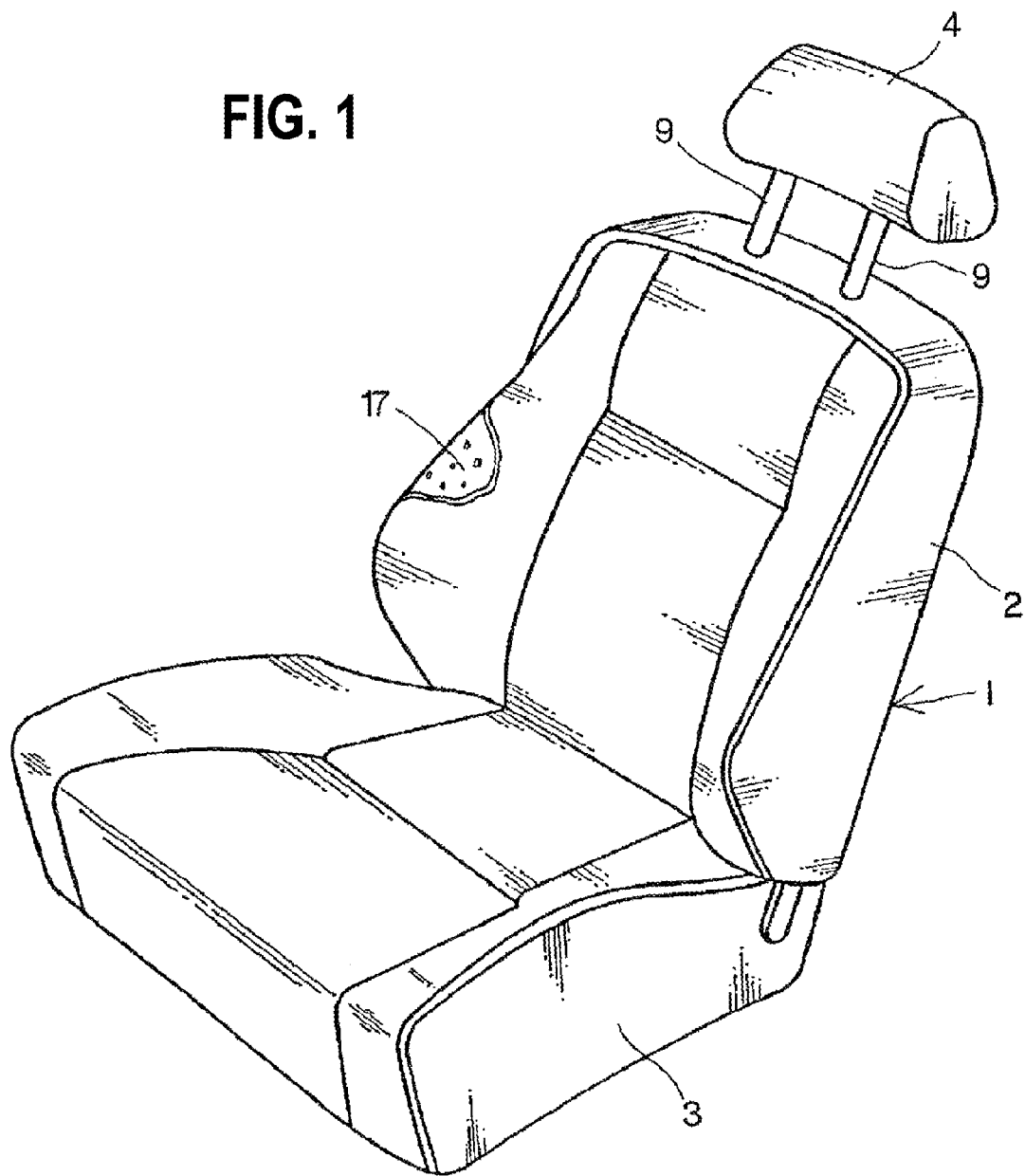
FIG. 1 is a perspective view showing a vehicle seat.
Figure 2:
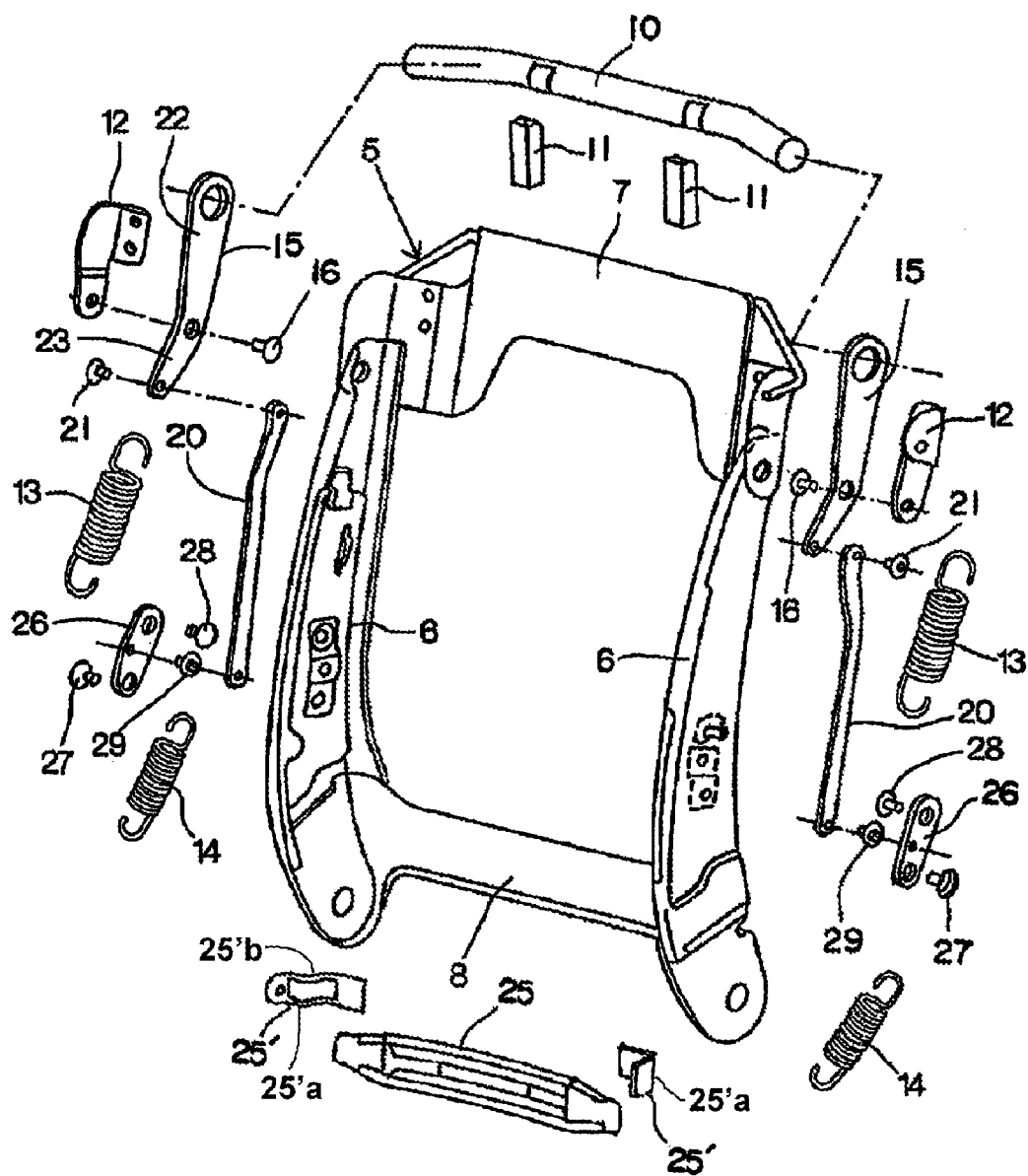
FIG. 2 is an exploded perspective view showing a seat back frame of the vehicle seat and basic components of an active headrest mechanism.
Figure 3:
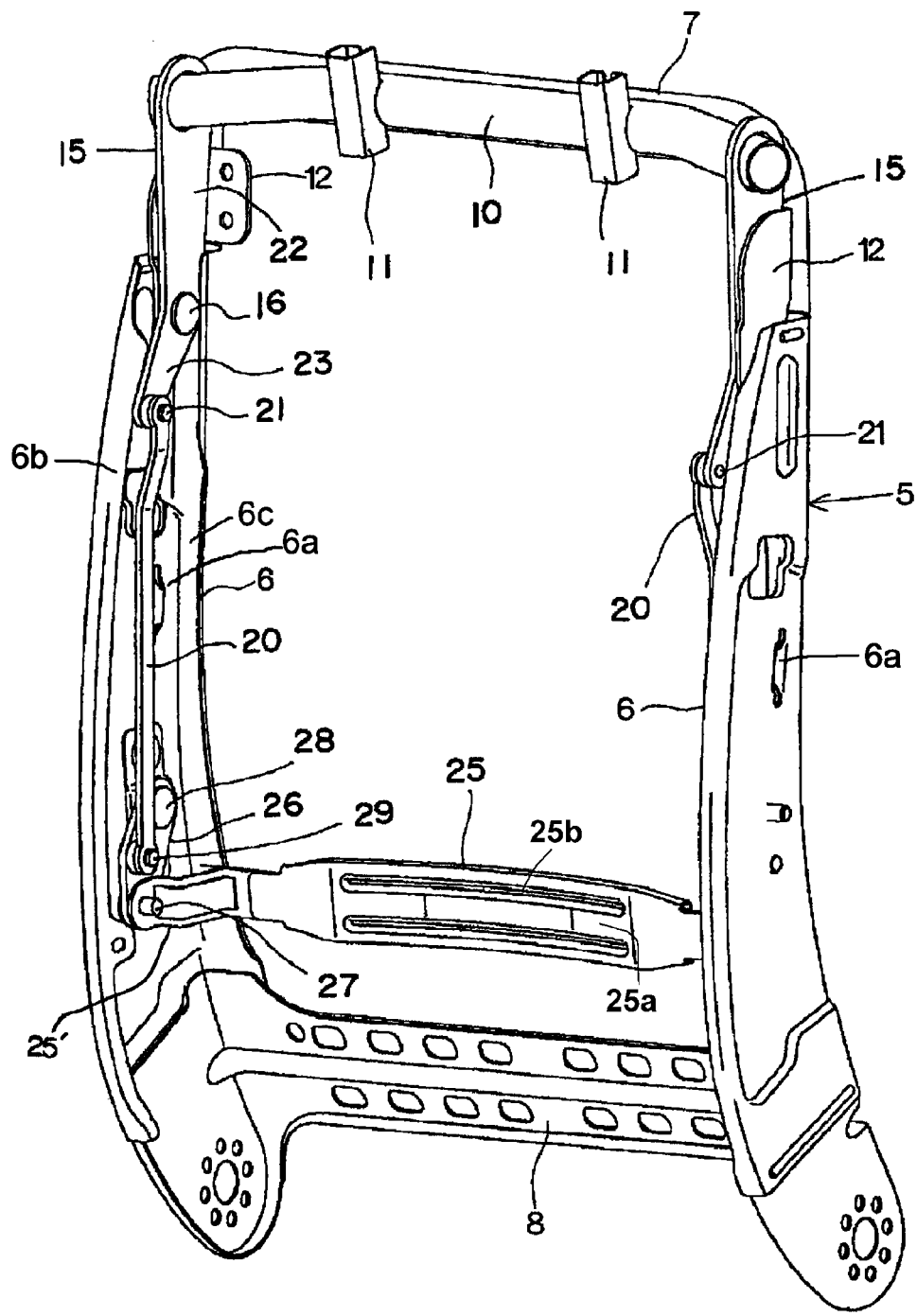
FIG. 3 is a perspective view showing an assembly of the components shown in FIG. 2.
Figure 4:
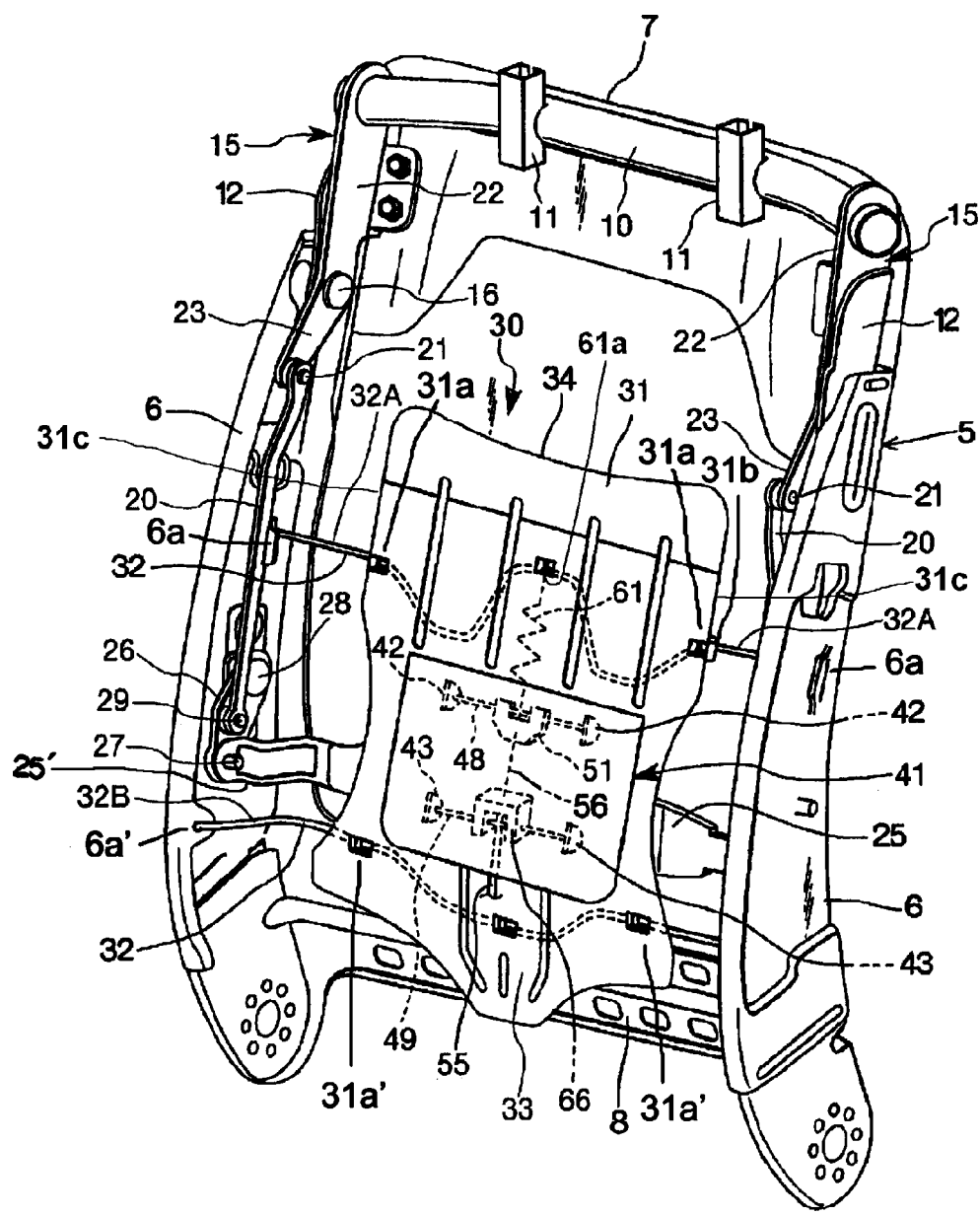
FIG. 4 is a perspective view showing a state that a cushion plate and an auxiliary plate are mounted to the assembly of FIG. 3.

An embodiment of the present invention will be described with reference to the accompanying drawings. Referring to FIGS. 1-4, a vehicle seat 1 of the present invention has a seat back 2, a seat bottom 3 and a headrest 4 provided at the top of the seat back 2. Referring to FIGS. 2 and 3, a seat back frame 5 of the seat back 2 includes a pair of side frames 6, an upper frame 7 and a lower frame 8, and has a substantial rectangular shape.

A headrest support (lateral member) 10 is arranged near the upper frame 7. The support 10 horizontally extends and is movable with respect to the seat back frame 5. Lower parts of pillars 9 of the headrest 4 are inserted into vertical engaging parts 11 which are fixed to the headrest support 10. The pillars 9 are vertically adjustable with the aid of the vertical engaging parts 11.

Figure 5:
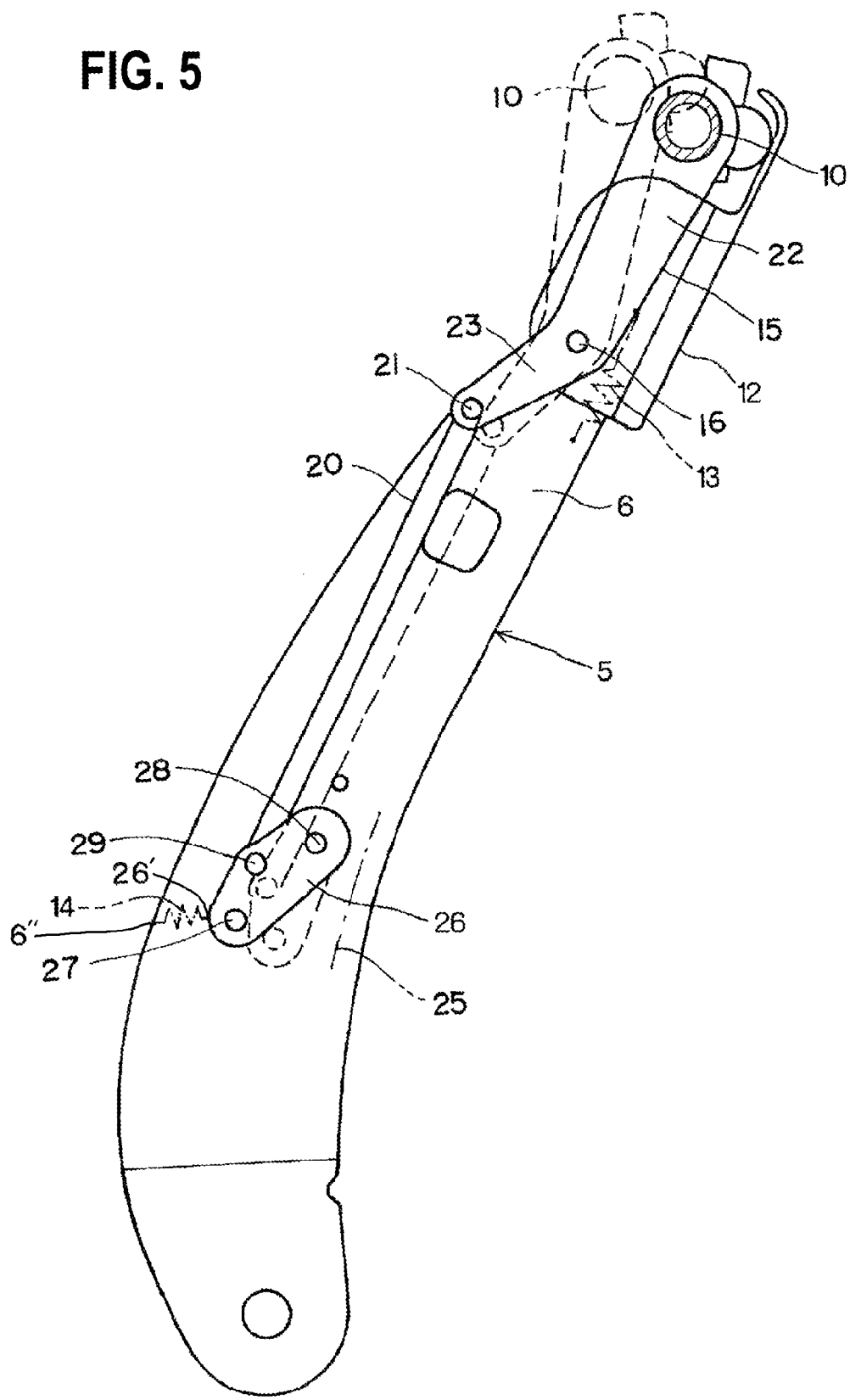
FIG. 5 is a side view showing a side frame of the seat back frame and the basic components of the active headrest mechanism.
Figure 6:
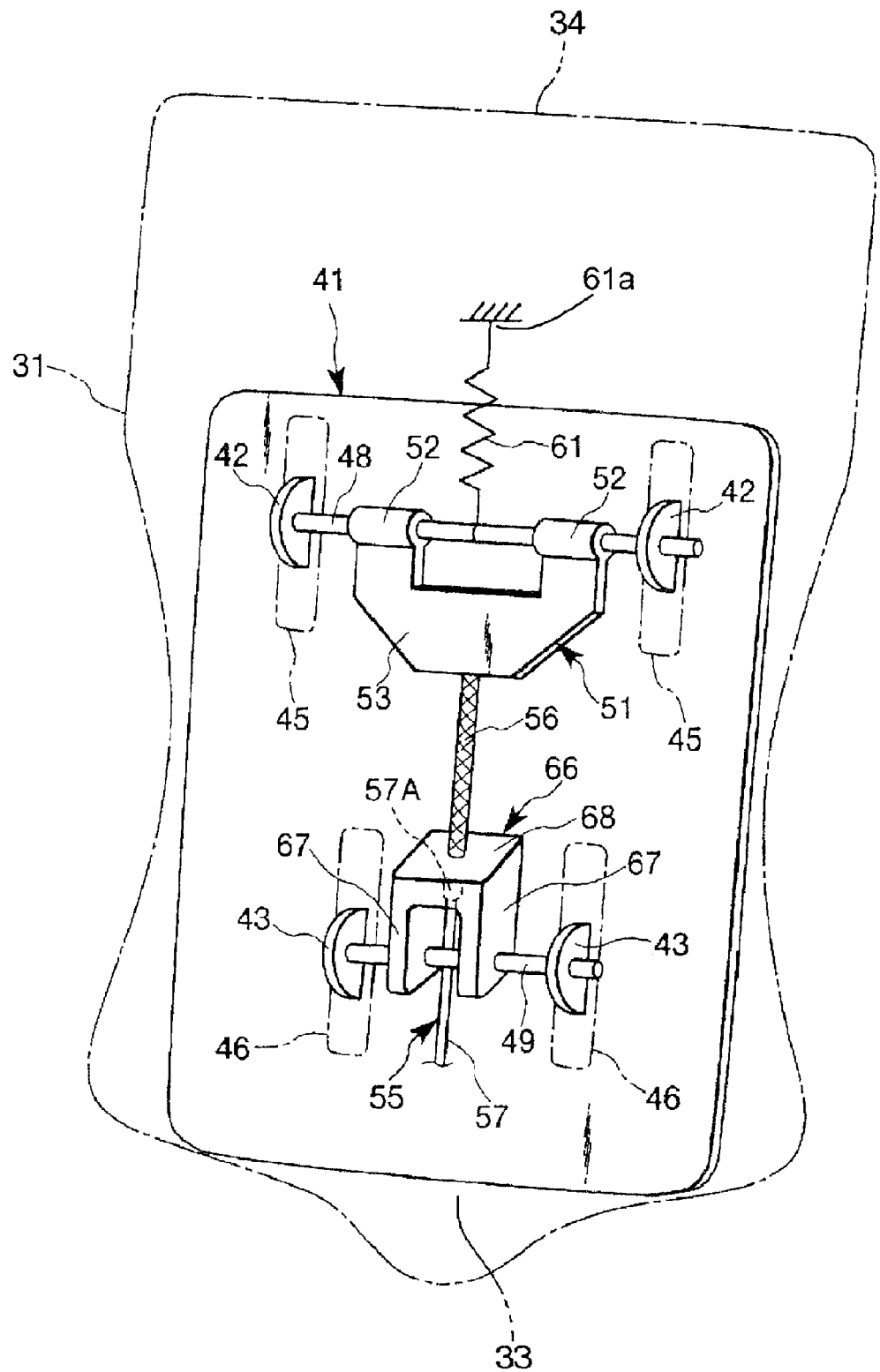
FIG. 6 is a perspective view showing the back sides of the cushion plate and the auxiliary plate.

Brackets 12 are fixed to the side frames 6, respectively. The frames comprise a front projecting wall 6b and a rear projecting wall 6c. An upper link (link member) or bell crank 15 is rotatably mounted to each bracket 12 by a shaft 16. Each upper link 15 includes an upper long arm 22 extending upward and a lower short arm 23 extending downwardly and to the front side. The upper link 15 is urged by resiliency of an upper spring (biasing member) 13 clockwise, as shown in FIG. 5. The upper spring 13 includes a first end coupled to the upper link 15 and a second end coupled to the side frame 6. The right and left ends of the headrest support 10 are coupled to the upper arms 22, respectively. Each lower arm 23 is axially fixed to the upper part of a longitudinally extending coupling (or load transmission) rod 20 by way of a pin 21.

The upper link 15 is normally held at a position indicated by a solid line in FIG. 5 by the resiliency of the upper spring 13 or the like, whereby the headrest 4 is also held at a normal position. However, when the upper link 15 is rotated counterclockwise toward a position indicated by a dotted line, the headrest support 10 forwardly moves and the headrest 4 is pushed to the front.

A horizontally extending vehicle rear-end collision detector 25 is arranged between the side frames 6, 6. When a rear-end collision occurs and the vehicle seat 1 relatively moves forward against the vehicle seat occupant T (FIG. 7), the collision detector 25 (FIGS. 3, 4) moves rearward by being pushed by the seat occupant T. Both ends of the collision detector 25 are coupled to lower links 26, 26 by way of pins 27, 27 (also "swinging shaft") which are axially fixed to the side frames 6, 6 by support shafts 28, 28, via connecting members 25', 25' respectively. The connecting members 25', 25' comprise a bend portion 25'a and a strengthening portion 25'b. The collision detector 25 also comprises a contact portion 25a, and a reinforcing portion (a bead) 25b. The lower part of the coupling rod 20 is coupled to the lower link (link member) 26 by way of a pin 29. As shown in FIG. 5, one end of a lower spring (biasing member) 14 is coupled to the lower link 26 at a first biasing member engagement portion 26', while the other end thereof is coupled to the side frame 6 at a second biasing member engagement portion 6", whereby the lower links 26 are urged counterclockwise. As a result, the collision detector 25 is held at a normal position, located in the front side.

When a rear-end collision occurs, the vehicle rear-end collision detector 25 is pushed by the seat occupant T to move rearward and to turn the lower links 26 counterclockwise in FIG. 5 and to lower the coupling rod 20. At this time, a distance between the pin 29 and the shaft 28 is shorter than a distance between the pin 27 and the shaft 28, so that a backward movement of the collision detector 25 is efficiently transmitted to the coupling rod 20. A downward movement of the rod 20 rotates the upper link 15 counterclockwise so that the headrest support 10 moves forward. The upper arm 22 of the upper link 15 is longer than the lower arm 23 so that the downward movement of the coupling rod 20 efficiently causes the headrest support 10 to move forward. The forward movement of the headrest support 10 pushes the headrest 4 to the front, thereby protecting a head (neck) of the seat occupant T at the time of the rear-end collision.

The side frames 6 are formed with a metal plate having a predetermined width as viewed in the front-and-back direction. A transmission mechanism for transmitting a backward movement of the vehicle rear-end collision detector 25 to the headrest support 10 is located at a position near the side frames 6. Accordingly, a cushion 17 of the seat back 2 does not interfere with a motion of the transmission mechanism. A mechanism ranging from the collision detector 25 to the headrest support 10 forms an active headrest mechanism.

Figure 8:
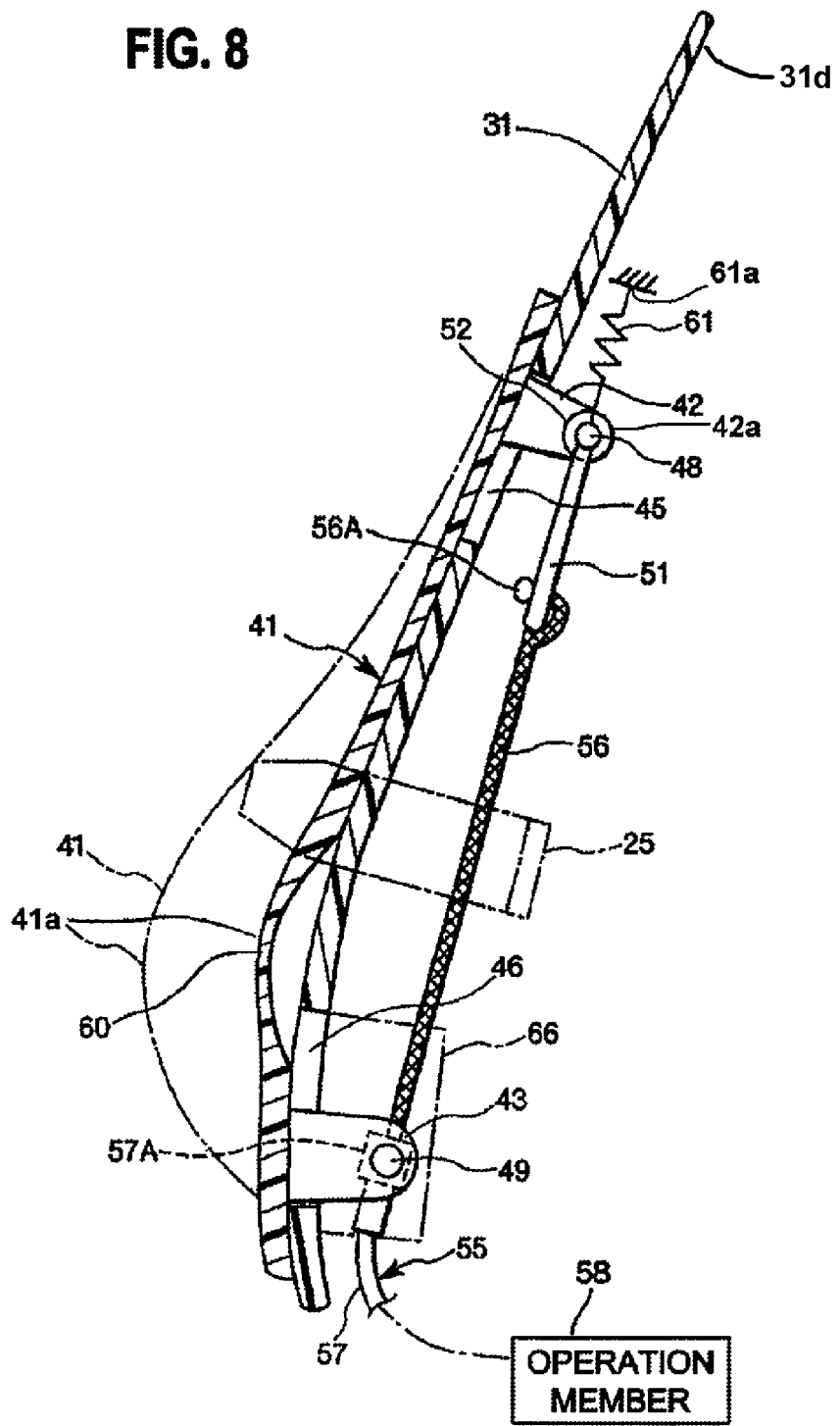
FIG. 8 is a longitudinal sectional view showing the cushion plate and the auxiliary plate.

A flexible plate member 30 comprises a flexible cushion plate 31 and a flexible auxiliary plate 41. The flexible cushion plate 31 is arranged inside the seat back frame 5. The cushion plate 31 is preferably made of synthetic resin such as polypropylene, and is substantially a single rectangular plate. The cushion plate 31 is attached to seat springs 32 such as zigzag springs or formed wire springs at mounting portions (wire engagement portions) 31a, 31a' that may include a rearward projecting portion 31b. The seat springs 32 include at least an upper seat spring/wire member 32A and a lower seat spring 32B, the lower seat spring 32B being attached to the cushion plate 31 at a mounting portion 31 a' within a protruding portion 31c, and to the side frame 6 at a wire spring engagement portion 6a'. The seat springs 32 horizontally extend and are respectively coupled to the side frames 6 of the seat back frame 5 at wire spring engagement portions 6a, 6a'. The seat back cushion 17 is provided in front of the cushion plate 31. The flexible cushion plate 31 has a part 31d that extends rearward of the collision detector 25 (see FIG. 8).

When the flexible cushion plate 31 receives a load from the seat occupant T, the cushion plate 31 moves rearward against the elasticity of the seat springs 32 and flexibly supports the seat occupant T. The cushion plate 31 supports the seat back cushion 17 in "plane". Therefore, the cushion plate makes the seat occupant T feel more stable and comfortable than the conventional one in which the seat back cushion 17 is supported by only the seat springs 32.

Figure 7:
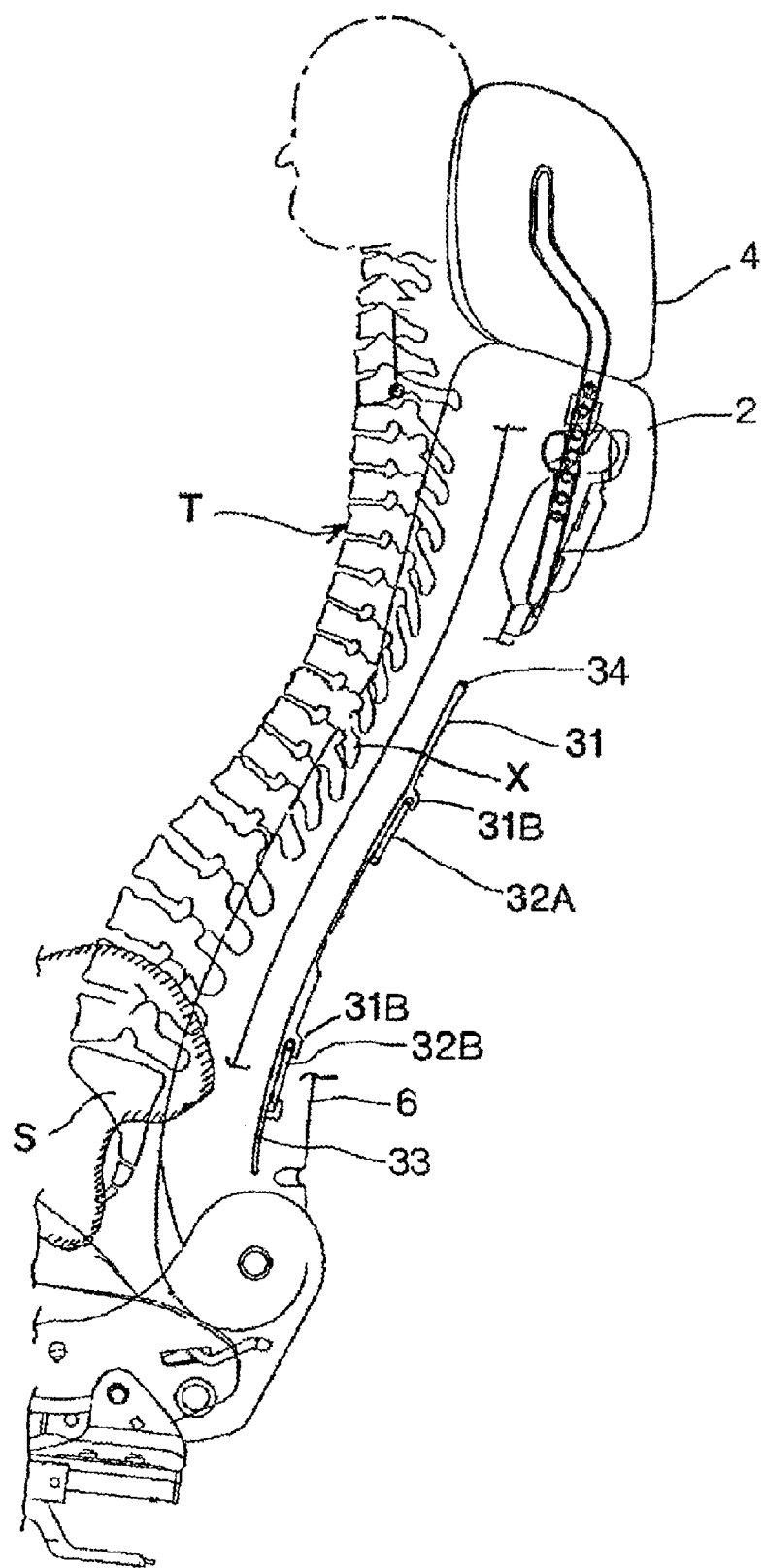
FIG. 7 is a side view showing a relationship between a part of skeleton of a seated person and the cushion plate.

An upper edge 34 of the flexible cushion plate 31, as shown in FIG. 7, is located somewhat higher than the ninth thoracic vertebra X of the seat occupant T of the average height. The center gravity of the upper body of the seat occupant T is positioned near the ninth thoracic vertebra X. The cushion plate 31 is able to effectively support a part around the center of gravity of the seat occupant T.

The upper seat spring 32A is selected to be at substantially the same height level as the ninth thoracic vertebra X or somewhat lower than it. In FIG. 7, the upper seat spring 32A is located somewhat lower than the ninth thoracic vertebra X. The reason for this is that a load of the upper part of the body to the seat back cushion 17 usually acts on the rearward side.

The flexible cushion plate 31 includes a lower part 33 for supporting a portion near the sacrum S of the pelvis. The lower part 33 enhances a holding property at a portion near the hip of the seat occupant T.

The vehicle rear-end collision detector 25 is located in the rear of the flexible cushion plate 31 in a state that a predetermined space is present therebetween. Since the cushion plate 31 takes a plate-like shape for broadly covering the back of the seat occupant T, the flexible cushion plate 31 receives a load of the seat occupant T on a wide area when a rear-end collision occurs, and moves rearwardly. The amount of a rearward movement of the flexible cushion plate 31 is the largest between a mid portion as vertically viewed and a portion somewhat lower than the mid position. Therefore, the collision detector 25 is preferably located at a mid position as vertically viewed or a position somewhat lower than the mid position in order to reliably receive the rearward movement of the cushion plate 31. Since a width of the seat back 2 as viewed in the front-and-back direction becomes narrower upward, it is not preferable that the collision detector 25 is located at an upper position on the rear side of the flexible cushion plate 31.

A flexible auxiliary plate 41 is provided between the flexible cushion plate 31 and the seat back cushion 17. Collectively, the flexible cushion plate 31 and auxiliary plate 41 may be construed as a load receiving member. The auxiliary plate 41 is preferably made of synthetic resin such as polypropylene, and is substantially a single rectangular plate, which is smaller than the flexible cushion plate 31. When the auxiliary plate 41 is operated by the seat occupant T, it is bent to the front and pushes the seat back cushion 17 forwardly, thereby adjusting a cushion pressure against the seat occupant T.

The auxiliary plate 41, which has a top portion 41a, is provided with rearward projecting upper sliders 42 and lower sliders 43. The upper sliders 42 protrude at a rearward projecting portion 42a (a retainer) to the rear side of the flexible cushion plate 31 through vertical upper slits 45 formed in the cushion plate 31. The lower sliders 43 protrude to the rear side of the cushion plate 31 through vertical lower slits 46 formed in the cushion plate 31. An upper horizontal mounting shaft (a linear member) 48 is bridged between the upper sliders 42 and 42, and a lower horizontal mounting shaft 49 is bridged between the lower sliders 43 and 43.

The auxiliary plate 41 is mounted to the cushion plate 31 by using the mounting shafts 48 and 49. The sliders 42 and 43 are vertically slidable in the slits 45 and 46, respectively. When the upper sliders 42 are moved downwardly and the lower sliders 43 are moved upwardly, the auxiliary plate 41 is bent to the front.

An upper U-shaped bracket 51 is rotatably mounted on the upper horizontal mounting shaft 48. The bracket 51 includes a pair of arms 52 mounted to the mounting shaft 48 and a coupling part 53 provided between the arms 52. A cable head 56A of an inner cable 56 of a wire cable 55 is placed on and secured to the coupling part 53. A lower bracket 66 is rotatably mounted to the lower horizontal mounting shaft 49. The lower bracket 66 includes a pair of arms 67 mounted to the mounting shaft 49 and a coupling part 68 provided between the arms 67. A tube head 57A of an outer tube 57 of the wire cable 55 is placed on and secured to the lower bracket 66. The other end of the wire cable 55 is coupled to an operation member 58 provided on the vehicle seat 1.

When the operation member 58 is operated, a distance between the cable head 56A and the tube head 57A, i.e., a distance between the upper sliders 42 and the lower sliders 43 is adjusted. When the distance becomes long, the auxiliary plate 41 is parallel to the flexible cushion plate 31, and when it becomes short, the auxiliary plate 41 bends to project to the front. Thus, by operating the operation member 58, a degree of bending (forward projecting quantity) of the auxiliary plate 41 can be adjusted.

The auxiliary plate 41 includes a thin part 60 for defining a curved shape of the auxiliary plate 41. When the distance between the upper sliders 42 and the lower sliders 43 becomes short, the auxiliary plate 41 is curved with respect to the thin part 60. Accordingly, the curved shape of the auxiliary plate 41 is kept in a predetermined shape, and the cushion pressure adjustment by the auxiliary plate 41 is made effective by setting the thin part 60 at the lumber part of the seat occupant T.

A spring 61, having an upper end attaching portion 61a for urging the upper horizontal mounting shaft 48 upwardly is provided between the upper horizontal mounting shaft 48 and the flexible cushion plate 31 (or the upper seat spring 32A).

The flexible cushion plate 31 bends under a load from the seat occupant T and moves rearward against the elasticity of the seat springs 32, and flexibly supports the seat occupant T. The flexible cushion plate 31 supports the seat back cushion 17 in "plane". Therefore, the cushion plate makes the seat occupant T feel more stable and comfortable than the conventional one in which the seat back cushion 17 is supported by only the seat springs 32.

When a physique of the seat occupant T presents an insufficient pressure from the seat back cushion 17, the seated person pulls the inner cable 56 by operating the operation member 58 to reduce the distance between the upper sliders 42 and the lower sliders 43. Then, the auxiliary plate 41 protrudes forward with respect to the thin part 60, pushes the seat back cushion 17 forward to increase the cushion pressure, whereby the cushion pressure is adjusted as the seat occupant T desires.

When the auxiliary plate 41 is curved by the operation member 58, the cushion pressure is changed. Since the auxiliary plate 41 and the flexible cushion plate 31 are in overlapping relation, the load by the seat occupant T that the auxiliary plate 41 receives is directly dispersed into the flexible cushion plate 31 as a single large plate. Accordingly, the good stability and comfort of the seat back cushion 17 are not lost.

When a rear-end collision occurs, the flexible cushion plate 31 greatly moves rearward by the load from the seat occupant T to come into contact with the vehicle rear-end collision detector 25 and to move it backward. In turn, the lower links 26, in FIG. 5, rotate counterclockwise to lower the coupling rod 20. The downward movement of the coupling rod 20 turns the upper links 15 counterclockwise to move the headrest support 10 to the front. As a result, the headrest 4 pushed to the front to protect the head (neck) of the seat occupant T against the impact by the rear-end collision.

In this case, the distance between the pin 29 and the shafts 28 is shorter than that between the pins 27 and the shafts 28. Accordingly, the lower links 26 efficiently transmits the rearward movement of the collision detector 25 to the coupling rod 20. Since the upper arms 22 of the upper links 15 are longer than the lower arms 23, the downward movement of the coupling rod 20 is efficiently transmitted to the headrest support 10. Therefore, the forward movement of the headrest 4 is satisfactorily secured.

Since the cushion plate 31 is shaped like a plate broadly covering the back of the seat occupant T, it reliably receives the rearward movement of the seat occupant T at the time of the rear-end collision in a broad area to reliably transmit the rearward movement of the seat occupant T to the collision detector 25.

When the auxiliary plate 41 is bent by the operation member 58, the cushion pressure is changed. Since the flexible cushion plate 31 is shaped like a plate broadly covering the back of the seat occupant T, and receives the load from the seat occupant T in a dispersing manner, the change of the cushion pressure by the auxiliary plate 41 does not substantially move the positions of the flexible cushion plate 31 and the collision detector 25. Accordingly, the relative position of the cushion plate 31 to the collision detector 25 is retained and the change of the cushion pressure by the auxiliary plate 41 does not substantially interfere with the function of the active headrest mechanism.

What is claimed is:
1. A vehicle seat comprising:
a rectangular-shaped seat back frame having right and left side frames;
a flexible plate member provided between the right and left side frames;
a seat back cushion provided in front of the flexible plate member;

a mechanism for pushing the seat back cushion to a front direction by forwardly bending the flexible plate member;

a headrest for supporting a head of a seat occupant, wherein the headrest is forwardly movably connected to the right and left side frames via right and left link members; and a rear-end collision detecting plate disposed at a portion of the seat back frame behind the seat occupant, wherein the rear-end collision detecting plate detects rearward movement of the seat occupant;

wherein:

a portion of the flexible plate member that is located generally at the same height as the rear-end collision detecting plate is disposed anterior to the rear-end collision detecting plate; and an upper portion of the flexible plate member is disposed in a more rearward position of the seat than the rear-end collision detecting plate.

2. The vehicle seat according to claim 1, wherein:
the portion of the flexible plate member that is located generally at the same height as the rear-end collision detecting plate is disposed anterior to a central portion of the rear-end collision detecting plate.

3. The vehicle seat according to claim 1, further comprising:
a biasing member that biases one of said link members;
wherein:
a lower end portion of the biasing member is connected to a rear portion of one of said side frame members corresponding to said one of said link members and is disposed in a more rearward position of the seat than the rear-end collision detecting plate.

4. The vehicle seat according to claim 1, further comprising:
a biasing member that biases one of said link members; and
a bracket fixed to one of said side frame members corresponding to said one of said link members; wherein the link member is mounted to the bracket via a shaft;
wherein:
an upper end portion of the biasing member is disposed in a more rearward position of the seat than the shaft.

5. The vehicle seat according to claim 1, wherein:
a reinforcing portion is integrally formed in a region of the rear-end collision detecting plate opposite to the flexible plate member in a front-to-back direction.

6. The vehicle seat according to claim 1, wherein:
a reinforcing portion is integrally formed in a contact portion of the rear-end collision detecting plate with which the flexible plate member comes into contact by the rearward movement of the seat occupant.

7. The vehicle seat according to claim 1, wherein:
a plurality of beads protruding in a front-to-back direction are formed in a region of the rear-end collision detecting plate opposite to the flexible plate member in a front-to-back direction.

8. The vehicle seat according to claim 7, wherein:
the plurality of beads extend in a horizontal direction and protrude rearward.

9. The vehicle seat according to claim 1, wherein:
a bead protruding rearward is formed in a contact portion of the rear-end collision detecting plate with which the flexible plate member comes into contact by the rearward movement of the seat occupant.

10. The vehicle seat according to claim 1, wherein:
each end portion of the rear-end collision detecting plate is provided with a bend portion that bends forward; and a lower end of the bend portion is disposed higher, in a top-to-bottom direction, than a lower end of a central portion of the rear-end collision detecting plate.

11. The vehicle seat according to claim 10, wherein:
at least one of the bend portions is provided with a strengthening portion.

12. The vehicle seat according to claim 11, wherein:
the strengthening portion of the bend portion extends outward in a horizontal direction.

13. The vehicle seat according to claim 1, wherein:
the rear-end collision detecting plate is disposed at a position that avoids a maximum forward portion of a curve of the flexible plate member formed when the flexible plate member is bent.

14. The vehicle seat according to claim 1, further comprising:
a biasing member that biases one of said link members;
wherein:
a lower end portion of the biasing member is connected to a rear portion of one of said side frame members corresponding to said one of said link members and is disposed in a more rearward position of the seat than the rear-end collision detecting plate; and
a bead protruding rearward is formed in a contact portion of the rear-end collision detecting plate with which the flexible plate member comes into contact by the rearward movement of the seat occupant.

15. The vehicle seat according to claim 14, wherein:
the rear-end collision detecting plate is disposed at a position that avoids a maximum forward portion of a curve of the flexible plate member formed when the flexible plate member is bent.

16. The vehicle seat according to claim 1, further comprising:
a biasing member that biases one of said link members;
wherein:
a lower end portion of the biasing member is connected to a rear portion of one of said side frame members corresponding to said one of said link members and is disposed in a more rearward position of the seat than the rear-end collision detecting plate; and
the rear-end collision detecting plate is disposed at a position that avoids a maximum forward portion of a curve of the flexible plate member formed when the flexible plate member is bent.

17. The vehicle seat according to claim 1, wherein:
a bead protruding rearward is formed in a contact portion of the rear-end collision detecting plate with which the flexible plate member comes into contact by the rearward movement of the seat occupant; and
the rear-end collision detecting plate is disposed at a position that avoids a maximum forward portion of a curve of the flexible plate member formed when the flexible plate member is bent.

18. A vehicle seat comprising:
a rectangular-shaped seat back frame having right and left side frames;
a flexible plate member provided between the right and left side frames;
a seat back cushion provided in front of the flexible plate member;
a mechanism for pushing the seat back cushion to a front direction by forwardly bending the flexible plate member;
a headrest for supporting a head of a seat occupant, wherein the headrest is forwardly movably connected to the right and left side frames via right and left link members; and a rear-end collision detecting plate disposed at a portion of the seat back frame behind the seat occupant, wherein the rear-end collision detecting plate detects rearward movement of the seat occupant;
wherein:
at least a part of the flexible plate member is disposed anterior to the rear-end collision detecting plate and located generally at the same height as the rear-end collision detecting plate;
a rearward projecting portion projecting rearward is formed in a portion of the flexible plate member located above the rear-end collision detecting plate; and
at least a part of the rearward projecting portion is disposed above and in a more rearward position of the seat than the rear-end collision detecting plate.

19. The vehicle seat according to claim 18, wherein:
the rearward projecting portion comprises a retainer for retaining a linear member.

20. The vehicle seat according to claim 19, wherein:
the linear member comprises a part of the mechanism for pushing the seat back cushion to the front direction.

21. The vehicle seat according to claim 18, further comprising:
a biasing member that biases one of said link members;
wherein:
a lower end portion of the biasing member is connected to a rear portion of one of said side frame members corresponding to said one of said link members and is disposed in a more rearward position of the seat than the rear-end collision detecting plate.

22. The vehicle seat according to claim 18, further comprising:
a biasing member that biases one of said link members; and
a bracket fixed to one of said side frame members corresponding to said one of said link members; wherein the link member is mounted to the bracket via a shaft;
wherein:
an upper end portion of the biasing member is disposed in a more rearward position of the seat than the shaft.

23. The vehicle seat according to claim 18, wherein:
a plurality of beads protruding in a front-to-back direction are formed in a region of the rear-end collision detecting plate opposite to the flexible plate member in a front-to-back direction.

24. The vehicle seat according to claim 23, wherein:
the plurality of beads extend in a horizontal direction and protrude rearward.

25. The vehicle seat according to claim 18, wherein:
a bead protruding rearward is formed in a contact portion of the rear-end collision detecting plate with which the flexible plate member comes into contact by the rearward movement of the seat occupant.

26. The vehicle seat according to claim 18, wherein:
each end portion of the rear-end collision detecting plate is provided with a bend portion that bends forward; and
a lower end of the bend portion is disposed higher, in a top-to-bottom direction, than a lower end of a central portion of the rear-end collision detecting plate.

27. The vehicle seat according to claim 26, wherein:
at least one of the bend portions is provided with a strengthening portion.

28. The vehicle seat according to claim 27, wherein:
the strengthening portion of the bend portion extends outward in a horizontal direction.

29. The vehicle seat according to claim 18, wherein:
the rear-end collision detecting plate is disposed at a position that avoids a maximum forward portion of a curve of the flexible plate member formed when the flexible plate member is bent.

30. A vehicle seat comprising:
a rectangular-shaped seat back frame having right and left side frames;
a wire member supported by the seat back frame between the side frames;
a flexible plate member mounted to the wire member;
a seat back cushion provided in front of the flexible plate member;
a mechanism for pushing the seat back cushion to a front direction by forwardly bending the flexible plate member;
a wire engagement portion provided on the flexible plate member to engage the wire member;
a headrest for supporting a head of a seat occupant, wherein the headrest is forwardly movably connected to the right and left side frames via right and left link members;
a rear-end collision detecting plate disposed at a portion of the seat back frame behind the seat occupant, wherein the rear-end collision detecting plate detects rearward movement of the seat occupant;
an upper portion of the seat back frame extending in a horizontal direction; and
a lateral member that is generally parallel to the upper portion of the seat back frame and supports a pillar of the headrest;
wherein:
each end portion of the rear-end collision detecting plate is connected to a lower end portion of each link member;
a portion of the flexible plate member that is located generally at the same height as the rear-end collision detecting plate is disposed anterior to the rear-end collision detecting plate;
the lateral member is disposed opposite to an upper end of the flexible plate member and is larger in length in a lateral direction than the flexible plate member;
the rear-end collision detecting plate is disposed below and generally parallel to the lateral member; and
an upper portion of the flexible plate member is disposed in a more rearward position of the seat than the rear-end collision detecting plate.

31. The vehicle seat according to claim 30, wherein:
the upper portion of the flexible plate member is disposed between the lateral member and an upper end of the rear-end collision detecting plate.

32. The vehicle seat according to claim 30, wherein:
a rearward projecting portion projecting rearward is formed in a portion of the flexible plate member located above the rear-end collision detecting plate; and
the rearward projecting portion comprises a retainer for retaining a linear member.

33. The vehicle seat according to claim 32, wherein:
the linear member comprises a part of the mechanism for pushing the seat back cushion to the front direction.

34. The vehicle seat according to claim 30, further comprising:
a biasing member that biases one of said link members;
wherein:
a lower end portion of the biasing member is connected to a rear portion of one of said side frame members corresponding to said one of said link members and is disposed in a more rearward position of the seat than the rear-end collision detecting plate.

35. The vehicle seat according to claim 30, further comprising:
a biasing member that biases one of said link members; and
a bracket fixed to one of said side frame members corresponding to said one of said link members; wherein the link member is mounted to the bracket via a shaft;
wherein:
an upper end portion of the biasing member is disposed in a more rearward position of the seat than the shaft.

36. The vehicle seat according to claim 30, wherein:
a plurality of beads protruding in a front-to-back direction are formed in a region of the rear-end collision detecting plate opposite to the flexible plate member in a front-to-back direction.

37. The vehicle seat according to claim 36, wherein:
the plurality of beads extend in a horizontal direction and protrude rearward.

38. The vehicle seat according to claim 30, wherein:
a bead protruding rearward is formed in a contact portion of the rear-end collision detecting plate with which the flexible plate member comes into contact by the rearward movement of the seat occupant.

39. The vehicle seat according to claim 30, wherein:
each end portion of the rear-end collision detecting plate is provided with a bend portion that bends forward; and
a lower end of the bend portion is disposed higher, in a top-to-bottom direction, than a lower end of a central portion of the rear-end collision detecting plate.

40. The vehicle seat according to claim 39, wherein:
at least one of the bend portions is provided with a strengthening portion.

41. The vehicle seat according to claim 40, wherein:
the strengthening portion of the bend portion extends outward in a horizontal direction.

42. The vehicle seat according to claim 30, wherein:
the rear-end collision detecting plate is disposed at a position that avoids a maximum forward portion of a curve of the flexible plate member formed when the flexible plate member is bent.

43. The vehicle seat according to claim 30, further comprising:
a biasing member that biases one of said link members; and
a bracket fixed to one of said side frame members corresponding to said one of said link members; wherein the link member is mounted to the bracket via a shaft;
wherein:
an upper end portion of the biasing member is disposed in a more rearward position of the seat than the shaft; and
the lateral member is disposed higher, in a top-to-bottom direction, than an upper end portion of the biasing member.

44. The vehicle seat according to claim 30, further comprising:
a biasing member that biases one of said link members; and
a bracket fixed to one of said side frame members corresponding to said one of said link members; wherein the link member is mounted to the bracket via a shaft;
wherein:
an upper end portion of the biasing member is disposed in a more rearward position of the seat than the shaft; and
the lateral member is disposed higher, in a top-to-bottom direction, than an upper end portion of the shaft.

45. A vehicle seat comprising:
a rectangular-shaped seat back frame having right and left side frames;
a flexible plate member provided between the right and left side frames;
a seat back cushion provided in front of the flexible plate member;
a mechanism for pushing the seat back cushion to a front direction by forwardly bending the flexible plate member;
a headrest for supporting a head of a seat occupant, wherein the headrest is forwardly movably connected to the right and left side frames via right and left link members; and
a rear-end collision detecting plate disposed at a portion of the seat back frame behind the seat occupant, wherein the rear-end collision detecting plate detects rearward movement of the seat occupant;
wherein:
at least a part of the flexible plate member is disposed anterior to the rear-end collision detecting plate; and
at least another part of the flexible plate member is disposed more rearward position of the seat than the rear-end collision detecting plate;
the vehicle seat further comprising:
a biasing member that biases one of said link members;
wherein:
a lower end portion of the biasing member is connected to a rear portion of one of said side frame members corresponding to said one of said link members and is disposed in a more rearward position of the seat than the rear-end collision detecting plate.

46. A vehicle seat comprising:
a rectangular-shaped seat back frame having right and left side frames;
a flexible plate member provided between the right and left side frames;
a seat back cushion provided in front of the flexible plate member;
a mechanism for pushing the seat back cushion to a front direction by forwardly bending the flexible plate member;
a headrest for supporting a head of a seat occupant, wherein the headrest is forwardly movably connected to the right and left side frames via right and left link members; and
a rear-end collision detecting plate disposed at a portion of the seat back frame behind the seat occupant, wherein the rear-end collision detecting plate detects rearward movement of the seat occupant;
wherein:
at least a part of the flexible plate member is disposed anterior to the rear-end collision detecting plate; and
at least another part of the flexible plate member is disposed more rearward position of the seat than the rear-end collision detecting plate;
a bead protruding rearward is formed in a contact portion of the rear-end collision detecting plate with which the flexible plate member comes into contact by the rearward movement of the seat occupant.

47. A vehicle seat comprising:
a rectangular-shaped seat back frame having right and left side frames;
a flexible plate member provided between the right and left side frames;
a seat back cushion provided in front of the flexible plate member;
a mechanism for pushing the seat back cushion to a front direction by forwardly bending the flexible plate member;

a headrest for supporting a head of a seat occupant, wherein the headrest is forwardly movably connected to the right and left side frames via right and left link members; and a rear-end collision detecting plate disposed at a portion of the seat back frame behind the seat occupant, wherein the rear-end collision detecting plate detects rearward movement of the seat occupant;

wherein:

at least a part of the flexible plate member is disposed anterior to the rear-end collision detecting plate; and at least another part of the flexible plate member is disposed more rearward position of the seat than the rear-end collision detecting plate;

the rear-end collision detecting plate is disposed at a position that avoids a maximum forward portion of a curve of the flexible plate member formed when the flexible plate member is bent.

* * * * *